United States Patent [19]
McLeod et al.

[11] Patent Number: 4,901,515
[45] Date of Patent: Feb. 20, 1990

[54] RAKE

[76] Inventors: Hannon S. McLeod; W. Stacy McLeod, both of Rte. 5 - Box 144, Lucedale, Miss. 39452

[21] Appl. No.: 255,327
[22] Filed: Oct. 11, 1988
[51] Int. Cl.⁴ .............................................. A01D 7/06
[52] U.S. Cl. ................................................. 56/400.18
[58] Field of Search ............. 56/400.18, 400.21, 400.2, 56/400.19, 400.17

[56] References Cited
U.S. PATENT DOCUMENTS

| | | | |
|---|---|---|---|
| 1,200,160 | 10/1916 | Bonnett | 56/400.18 |
| 1,260,906 | 3/1918 | Jarrett | 56/400.01 |
| 1,621,276 | 3/1927 | Richardson | 56/400.17 |
| 1,628,994 | 5/1927 | Orren | 56/400.2 |
| 1,735,237 | 11/1929 | Dennis | 56/400.17 |
| 1,780,180 | 11/1930 | Falstrom | 56/400.17 |
| 1,880,580 | 10/1932 | Tokunaga | 56/400.17 |
| 2,014,123 | 9/1935 | Bailie | 56/400.11 |
| 2,066,036 | 12/1936 | Greenwood | 56/400.17 |
| 2,072,992 | 3/1937 | Potemkin | 56/400.18 |
| 2,075,220 | 3/1937 | Neuhausen | 56/400.17 |
| 2,130,828 | 9/1938 | Sundqvist | 56/400.17 |
| 2,149,429 | 3/1939 | Finkes | 56/400.18 |
| 2,468,376 | 4/1949 | Peeples | 56/400.21 |
| 2,587,424 | 2/1952 | Zelman | 56/400.17 |
| 2,746,235 | 5/1956 | Kautenberg | 56/400.17 |
| 2,850,865 | 9/1958 | Anderson | 56/400.17 |
| 2,904,951 | 9/1959 | Glover | 56/400.18 |
| 3,111,175 | 11/1963 | Chambers et al. | 56/400.18 |
| 3,258,903 | 7/1966 | Rienacker et al. | 56/400.18 |
| 3,394,536 | 7/1968 | Henne | 56/400.18 |
| 3,727,389 | 4/1973 | Huspen | 56/400.18 |
| 3,750,379 | 8/1973 | Huspen | 56/400.18 |
| 4,215,528 | 8/1980 | Fodor | 56/400.17 |
| 4,649,698 | 3/1987 | Sykora | 56/400.17 |

FOREIGN PATENT DOCUMENTS 33765  4/1969  Taiwan .

Primary Examiner—Paul J. Hirsch
Attorney, Agent, or Firm—Cushman, Darby & Cushman

[57] ABSTRACT

An adjustable rake is provided having a rake tooth configuration including a rounded portion for structural integrity and a flattened portion to provide rake tooth resilience. An adjustable rake tooth mounting structure is also provided and is slidable along a rake handle. A rake tooth stabilizer is mounted to the distalmost end of the rake handle so that when the tooth mounting structure is slid relative to the handle, the rake teeth are moved from a spaced apart, open configuration to a closed configuration.

7 Claims, 4 Drawing Sheets

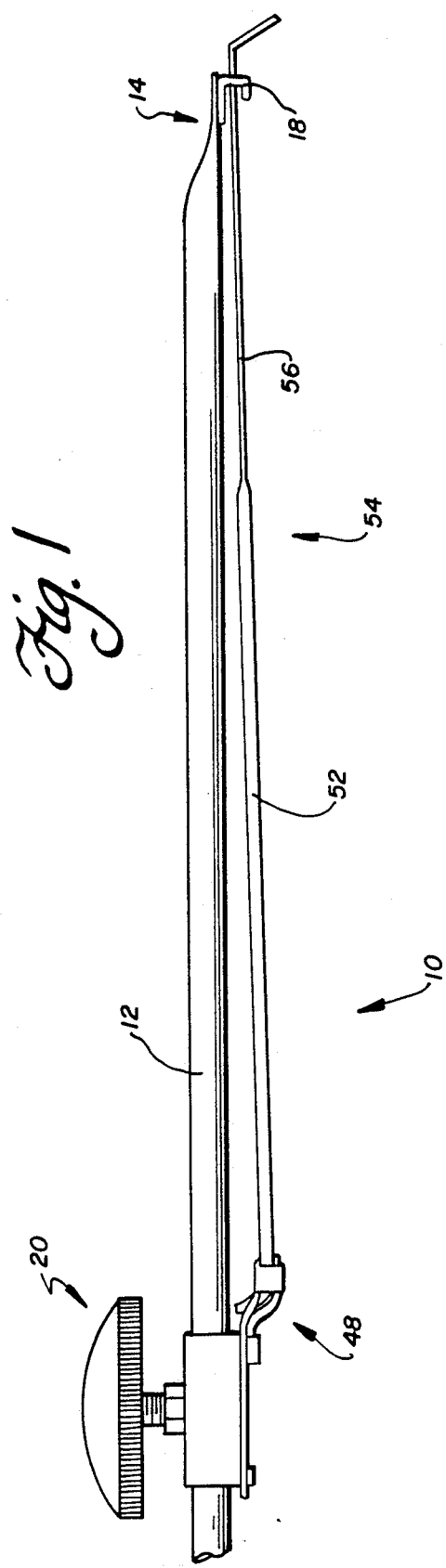
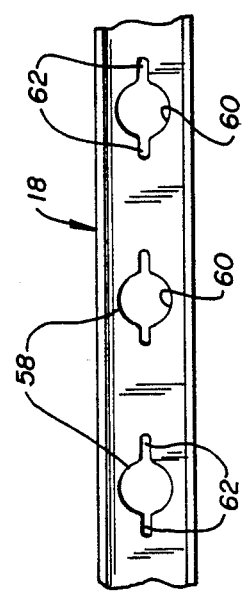

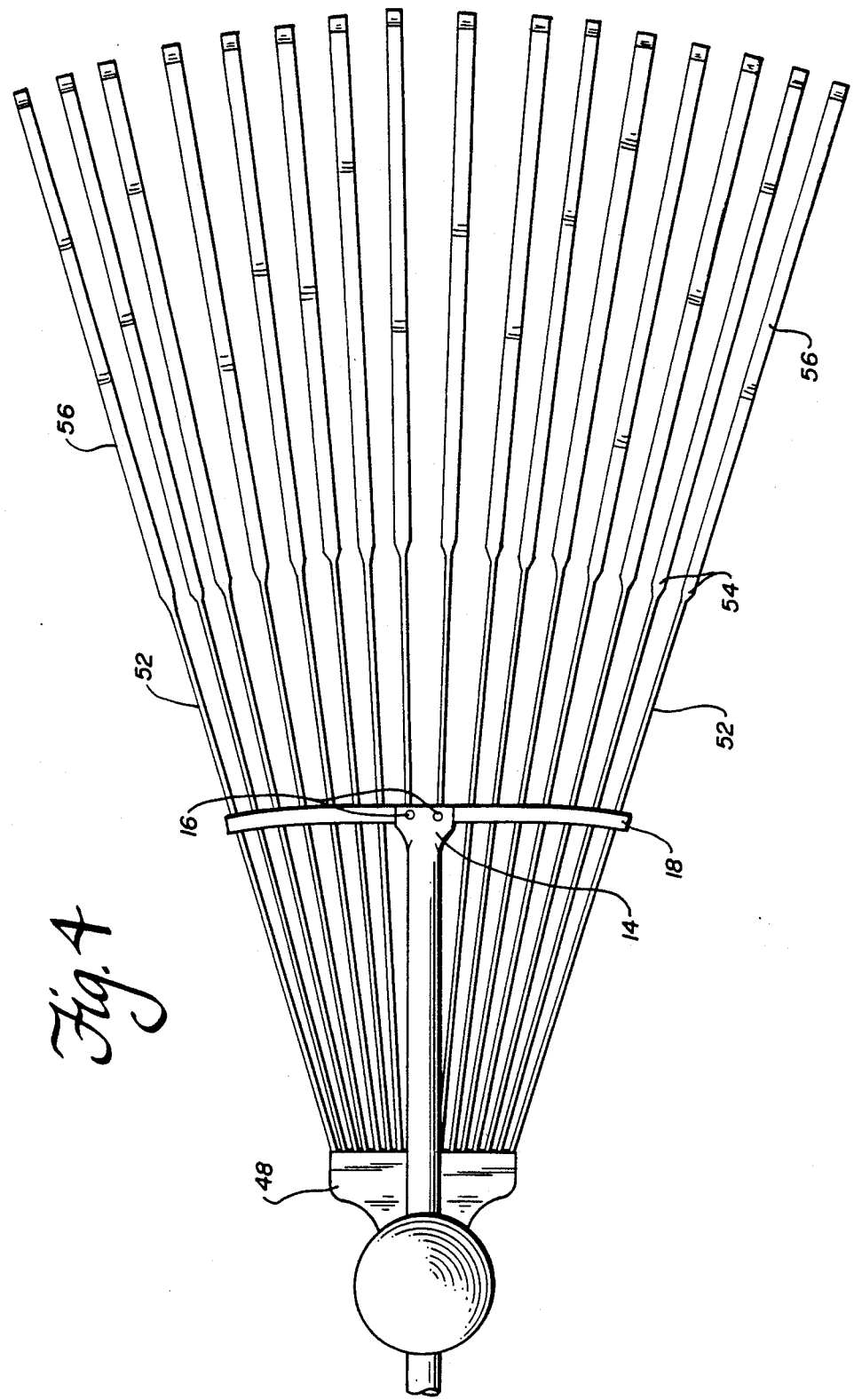

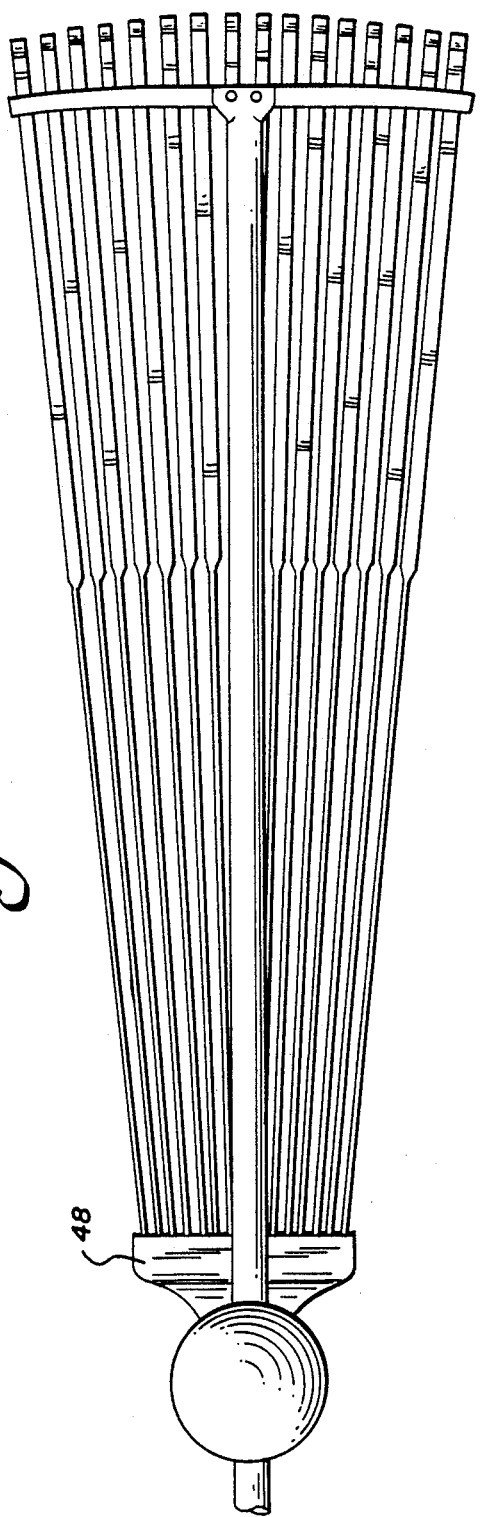

RAKE

BACKGROUND OF THE INVENTION

1. Field of the Invention

The present invention relates to a rake and, in particular, to a rake having an expandable head and having a rake tooth structure providing a spring-like rake tooth tip while maintaining the structural integrity of the tooth. The tooth structure also enables the user of the rake to extend the rake head to its fullest width while maintaining a relatively small gap between the teeth.

2. Description of the Related Art

Heretofore, various mechanisms have been provided to enable grass rakes to have varying head widths depending upon the particular needs of the user and to facilitate storage of the rake. Advantageously, such rakes are provided with very long teeth so that a wide range of rake head widths can be provided. However, the length of the teeth is limited because flat rake teeth can be too flexible if they extend too far from a more rigid support structure and thus their gathering ability is decreased. Additionally, such flat teeth can be permanently deformed in use due to the lack of support. On the other hand, round rake teeth which are far more rigid than flat teeth can be insufficiently flexible and springy for effectively raking leaves and the like.

It would therefore be desirable to provide an adjustable rake which has rake teeth formed so as to have sufficient flexibility adjacent the tips thereof to effectively rake cut grass, leaves and the like from atop dirt and living grass while having sufficient structural integrity such that the ends of the rake teeth effectively engage and move the material being raked and do not deform in use.

SUMMARY OF THE INVENTION

These and other objects are provided in accordance with the present invention by providing an adjustable rake including rake teeth which have a substantially circular cross-section along a proximal portion of the length thereof and have a flattened cross-section along the distal portion thereof and which further includes a sliding support assembly for varying the width of the rake head that can accommodate both of the cross-sectional profiles of the teeth.

Other objects, features and characteristics of the present invention, as well as the methods of operation and functions of the related elements of the structure, and the combination of parts and economies of manufacture, will become more apparent upon consideration of the following detailed description and the appended claims with reference to the accompanying drawings all of which form a part of this specification, wherein like reference numerals designate corresponding parts in the various figures.

BRIEF DESCRIPTION OF THE DRAWINGS

FIG. 1 is a schematic side elevational view of an expandable rake formed in accordance with the present invention;

FIG. 4 is a schematic top plan view of an expandable rake provided in accordance with the present invention with the rake head expanded;

FIG. 5 is a schematic top plan view of the rake head provided in accordance with the present invention with the rake head at a minimum width; and FIG. 6 is a partial front elevational view showing a rake tooth stabilizer provided in accordance with the present invention.

DETAILED DESCRIPTION OF THE PRESENTLY PREFERRED EXEMPLARY EMBODIMENT

Figure 2:
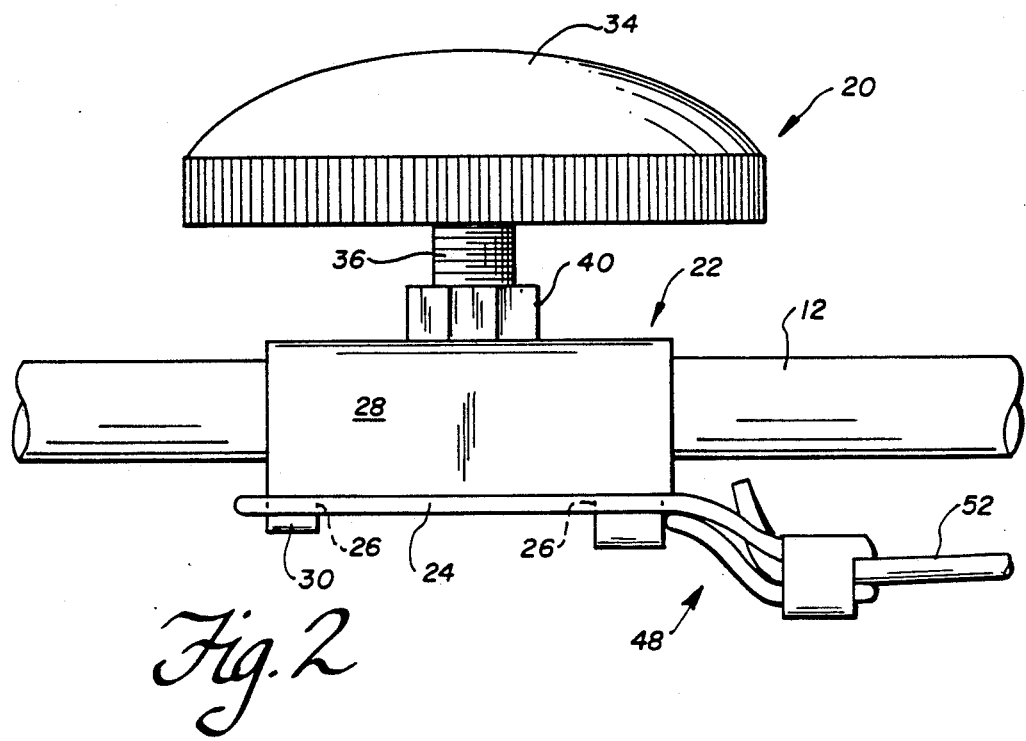
FIG. 2 is an enlarged schematic side elevational view of a slide/lock assembly provided in accordance with the present invention.

Referring to FIG. 1, the expandable rake provided in accordance with the present invention is shown. The rake 10 includes a pole or handle 12 which is substantially circular in cross-section. The proximal end of the handle 12 is omitted from the drawing FIGURES for clarity but it is to be appreciated that any conventional handle could be provided. Such a handle, furthermore, can be formed from wood, metal, or plastic. The handle 12 terminates distally in a flattened portion 14 having apertures 16, for example, for attaching thereto a rake tooth stabilizer 18 which will be described more fully below.

A slide/lock adjustment mechanism 20 is mounted to the handle 12 and is slidable along the longitudinal axis of the handle. The slide/lock adjustment mechanism 20 is shown most clearly in FIGS. 2 and 3. A dome-shaped housing 22 is mounted in surrounding relation to the rake handle 12 and preferably includes a substantially U-shaped portion 28 and a flat base 24, the U-shaped portion 28 having downwardly depending prongs or teeth 30 which can be inserted through correspondingly defined slots 26 in the base 24. The prongs 30 can be then bent relative to the depending legs 32 of the U-shaped portion 28 so as to lock it relative to the flat base 24. The handle 12 of the rake passes through the interior of the dome-shaped housing 22 and is slidable relative thereto.

A round knob 34 or similar structure is provided which can be manually gripped and rotated relative to the handle 12 to lock or unlock the dome-shaped housing 22 from handle 12. A bolt 36 is coupled to the knob 34 so as to rotate therewith. Further, an aperture 38 is defined in the uppermost surface of the dome-shaped housing 22 and is sized to receive the bolt 36 of the knob 34. A nut 40 or similar screw threaded structure is defined in surrounding relation to the aperture 38 and is sized to receive the bolt 36 of the knob 34. Thus, as the knob 34 is rotated relative to the dome-shaped housing 22, for example, in a clockwise direction, the bolt 36 will be threaded down through the nut 40 and towards the handle 12 of the rake which is disposed within the dome-shaped housing 22.

Figure 3:
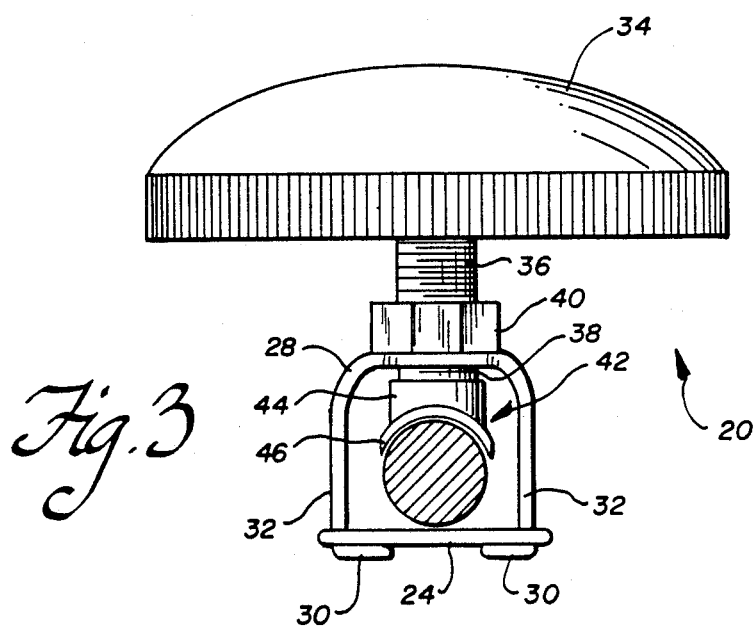
FIG. 3 is a rear elevational view of the slide/lock assembly of FIG. 2 with the rake teeth omitted for clarity.

As can be seen in particular in FIG. 3, a pressure plate 42 which has a hollow cylinder 44 extending upwardly therefrom and a solid curved base 46, is urged by the downwardly advancing bolt 36 into contact with the rake handle 12. Thus, rotating the knob 34 in a clockwise direction will urge the pressure plate 42 against the handle and will lock the dome-shaped housing 22 relative to the handle 12.

As can be further seen in particular in FIGS. 1 and 2, the base 24 of housing 22 has a forwardly extending attachment structure 48 which is adapted to engage and retain the proximal ends 52 of the rake teeth 54. In the illustrated embodiment, the teeth 54 are retained by a clamping relation between the base 24 and a base support 50. The rake teeth have an upwardly curved proximalmost end for facilitating the interlocking engagement with the base 24 of housing 22. As can be seen in FIGS. 4 and 5, the rake tooth attachment structure 48 extends outwardly to define a wide support structure for accommodating all of the teeth of the rake. Further, the interlocking engagement between the teeth 54 and the support structure 48 enable the teeth to pivot angularly in a horizontal plane relative to the attachment structure so that the various widths dictated by the tooth stabilizer 18 can be accommodated.

As shown in FIG. 1, the rake teeth 54 provided in accordance with the present invention have a substantially circular cross-section along approximately one-half to two-third of the length thereof, from the proximalmost end as shown at 52. The distal portions 56 of the rake teeth, on the other hand, have a substantially flattened cross-section. The flattened portion 56 of the teeth provide more resiliency than the rounded portion thereof and thus allows the user to gather leaves easier than with rounded teeth. However, the provision of the rounded portions 52 provides structural stability for the teeth along a substantial length while allowing the flexible end portions 56 to perform the leaf gathering function.

Referring to FIGS. 4 and 5, the slide/lock mechanism 20 can be loosened by rotating the knob 36 counterclockwise and thus the handle 12 of the rake can be slid relative to the rake mounting structure 48 to vary the width of the rake head. Thus, the rake tooth stablizer 18 mounted to the distalmost end of the rake handle 12 can be slid from a position as shown in FIG. 4 forwardly as the rake teeth are simultaneously drawn closer together to a closed or less open rake tooth configuration as shown in FIG. 5.

FIG. 6 shows the rake tooth stabilizer 18 provided in accordance with the present invention. The stabilizer 18 includes apertures 58 having a rounded central portion 60 and transversely extending cutouts 62. Thus, the rake stabilizer 18 can be slid longitudinally over the rounded portions 52 of the rake teeth 54 as well as along the flattened portions 56 thereof. The corresponding shape of the rake tooth stabilizer and the rake teeth enables the stabilizer to be slid along the entire length f the rake teeth which in turn enables a wide variety of rake widths to be accommodated. Furthermore, throughout the entire range of rake head widths, because approximately one half of the length of the rake teeth is formed from the more rigid, round cross-section portion 52, irrespective of the length of the rake tooth extending distally from the rake tooth stabilizer, the rounded portions 52 ensure that the tips of the teeth will not deform and that they will maintain their springiness to enable effective use of the rake to gather leaves and the like.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An adjustable rake comprising:
    an elongated handle member having a proximal end and a distal end;
    a plurality of rake teeth, each said rake tooth having a proximal portion having a substantially circular cross-section and a distal portion having a substantially flattened cross-section;
    means for mounting said rake teeth to said handle member; and
    a rake tooth stabilizer mounted to a distal end of said handle member and slidably receiving each of said rake teeth, at least one of said means for mounting and said rake tooth stabilizer being longitudinally slidable relative to said handle member, said rake tooth stabilizer being mounted into said handle member so as to have a longitudinal axis thereof disposed substantially transverse to a longitudinal axis of said handle member, said rake tooth stabilizer including a plurality of apertures defined along the length thereof for receiving each of said rake teeth, respectively, each said aperture of said rake tooth stabilizer having a substantially circular central portion and cut outs defined on either side thereof so as to selectively slidably receive either the round portion or the flat portion of said rake teeth;
    whereby sliding movement of said means for mounting relative to said rake tooth stabilizer moves said rake teeth from a spaced apart, open configuration having a maximum width wherein said circular portion of each said aperture slidably engages the circular proximal portion of each said rake tooth to a closed configuration having a minimum width wherein said cut out portions of each said aperture slidably engage the flattened distal portion of each said rake tooth.

2. An adjustable rake as in claim 1, wherein said means for mounting said rake teeth includes a housing mounted in surrounding relation to said handle member and slidably movable along a longitudinal axis of said handle member, said rake teeth being mounted to said housing.

3. An adjustable rake as in claim 2, wherein said housing includes a substantially U-shaped portion and a substantially flat base element, said U-shaped portion being fixedly coupled to said flat base element, the proximalmost ends of said rake teeth being clamped to said flat base element.

4. An adjustable rake as in claim 1, wherein said rake teeth are mounted so as to be pivotal relative to said handle member in a horizontal plane so as to be movable from a position wherein the distal ends thereof are in a spaced apart relation to a position wherein the distal ends thereof are in an immediately adjacent relation.

5. An adjustable rake as in claim 2, wherein said means for mounting further includes a knob element having a bolt element fixedly coupled thereto and rotatable therewith relative to said housing, said housing having an aperture defined therethrough for accommodating said bolt whereby rotation of said knob relative to said housing effects movement of said screw-threaded bolt member relative to a portion of the handle member disposed within said housing.

6. An adjustable rake as in claim 5, wherein said means for mounting further includes a pressure plate element disposed within said housing and disposed between said bolt and said handle member whereby rotation of said knob relative to said housing so as to move said bolt towards said handle member pushes said pressure plate against said handle member so as to lock said means for mounting relative to said handle member.

7. An adjustable rake as in claim 1, wherein said round proximal portion comprises at least about one half of the length of each said rake tooth.

* * * * *